June 16, 1953  D. E. WARNER  2,642,555
ADJUSTABLE SPEED INDUCTION MOTOR
Filed April 22, 1950
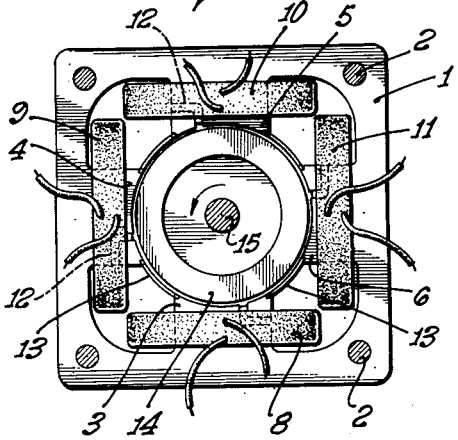
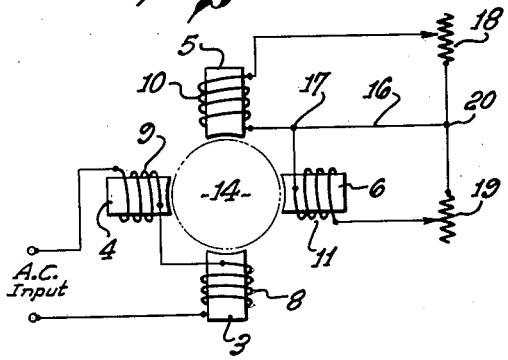
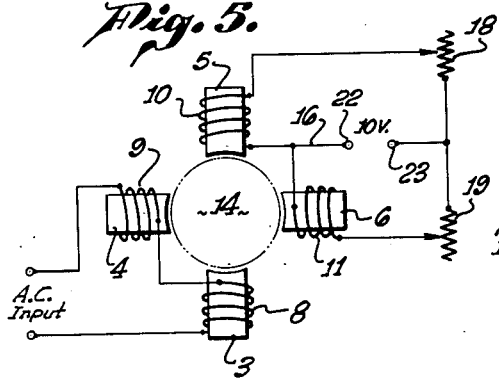
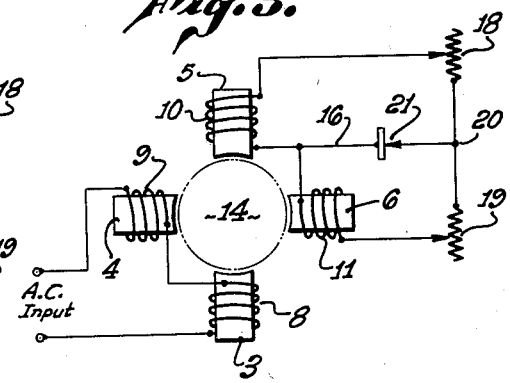
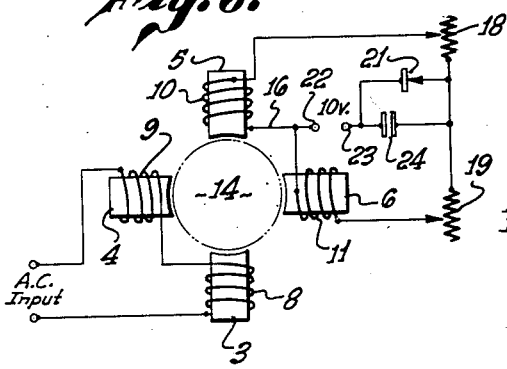
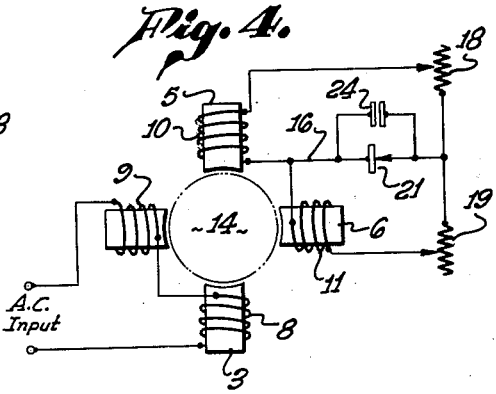
INVENTOR.
DONALD E. WARNER,
BY John Flam
ATTORNEY.

Patented June 16, 1953

2,642,555

UNITED STATES PATENT OFFICE 2,642,555

ADJUSTABLE SPEED INDUCTION MOTOR

Donald E. Warner, Los Angeles, Calif., assignor to Robert D. Newcomb, Los Angeles, Calif.

Application April 22, 1950, Serial No. 157,507

18 Claims. (Cl. 318—223)

This invention relates to induction motors, and particularly such motors as are designed to deliver low power. Such motors, for example, are used to drive phonographs, sound recorders, or the like.

It is well known that an induction motor will operate at nearly synchronous speed, that is, in direct ratio to the frequency of the source of supply. In some instances, however, it is desirable to obtain a substantially lower speed.

It is one of the objects of this invention to make it possible substantially to reduce the speed of such a motor, thus obviating reduction gearing, or the like.

Low output motors of this type have relatively low efficiency; and, although the present invention reduces the efficiency somewhat, this result is of relative little importance.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation of an induction motor, partly in section, incorporating the invention; and Figs. 2, 3, 4, 5, and 6 are diagrams illustrating modifications of the invention.

The induction motor stator is built up, in this instance, of a series of rectangular laminations 1, as of silicon steel, and held together by fastening means 2. In the present instance, a four-pole motor is illustrated.

The laminations 1 are provided with inwardly directed salient pole piece members 3, 4, 5, and 6. On these pole pieces are the field winding coils 8, 9, 10, and 11. Shading coils, indicated at 12 in Fig. 1, may be utilized for each of the pole pieces, and magnetic inserts 13 may extend between the pole pieces. A rotor 14 (which may be a squirrel cage) is mounted on a shaft 15. The direction of rotation is counterclockwise, as viewed in Fig. 1, in accordance with the positioning of the shading coils 12.

When all of the four coils 3, 4, 5, and 6 are supplied with an alternating current, the rotor 14 attains a speed slightly below synchronism.

When the motor is to be used for such purposes as phonograph drives, or the like, it is advantageous to be able to adjust the speed of the motor so that it rotates at a rate considerably below synchronous speed. In the present instance, this may be accomplished by the aid of control circuits illustrated in Figs. 2 to 6 inclusive.

In the form shown in Fig. 2, two adjacent coils 8 and 9 are connected in series or parallel to a source of alternating current, and form the input side of the motor. The pole pieces 3 and 4 serve to induce virtual poles in the other pole pieces 5 and 6.

The coils 10 and 11 of these pole pieces 5 and 6 are connected in a closed circuit by the aid of a connection 16 which leads to a common terminal 17 of both of the coils 10 and 11. Both coils 10 and 11 are in a closed circuit including a variable resistance. While this resistance for each coil might be included in connection 16 so that only one resistance would be needed, in the form shown, a pair of variable resistances 18 and 19 are used. In all the supplemental forms hereinafter described, such a modification (substitution of one resistance in the common lead 16) may be used. Thus the other terminals of the coils 10 and 11 are connected to variable resistances 18 and 19. The connection 16 extends to a point 20, intermediate the two resistances 18 and 19.

The two coils 10 and 11 are in closed circuits, the connection 16 being common to both of them.

It has been found that, as the resistances 18 and 19 are decreased, the speed of the motor is substantially reduced, for example, by about eleven per cent. If both of the coil circuits are open circuited, as by switches in the coil circuits, then synchronous speed is approached. When only one coil circuit is open, an intermediate control is effected.

The closed circuits for the coils 10 and 11 serve as braking circuits, due to the induction of electromagnetic forces therein by the rotation of the rotor 14. Although this reduces the efficiency, such a loss is tolerable, since motors of this character are rated as developing of from one two-hundredths (.005) horsepower to one one-hundredths (.01) horsepower.

The number of turns in coils 10 and 11 is not critical. They may be of the order of 1,000 turns for each coil. Ordinarily, the two variable resistances 18 and 19 are ganged together to be simultaneously adjusted.

In the form shown in Fig. 3, there is a rectifier 21 interposed in the connection 16. This may be of the ordinary selenium type. In this form, the current induced in the coils 10 and 11 is rectified and, consequently, a still further reduction in speed is obtained. The speed reduction may be of the order of fifteen per cent below the synchronous speed.

In the form shown in Fig. 4, the rectifier 21 is bridged by a condenser 24. This condenser will be charged when the rectifer 21 is non-conducting and will be discharged when the rectifier 21 is conducting. Accordingly, the direct current voltage returned to the coils 10 and 11 is increased and, consequently, there is a typical speed reduction of from eighteen to twenty per cent.

In Fig. 5, the coils 10 and 11 may be fed supplementarily by alternating current of about ten volts. This may be accomplished by placing the source of alternating current between the terminals 22 and 23, interposed in the connection 16. In this form there is a typical speed reduction of about twenty-one per cent.

In the form shown in Fig. 6, the rectifier 21 and condenser 24 are utilized; and, in addition, a source of alternating current of about ten volts is connected between the terminals 22 and 23 in the common connection 16. In this form of the circuit, speed reduction is obtained of about thirty-two per cent.

By adjustment of the resistances 18 and 19, intermediate values of the speed may be obtained.

In any of the forms illustrated, the reduction in speed is obtained in a simple and effective manner without undue heat losses in the motor.

The inventor claims:

1. In a single-phase induction motor having a stator with a plurality of equiangularly spaced polar members, and a rotor: a plurality of coils, respectively surrounding said members; means for supplying a single-phase alternating current to only some of the coils; there being at least two other coils; a pair of variable resistances; a connection intermediate the resistances to a point intermediate the other coils; and connections respectively between the other terminals of the resistances to other terminals of the said other coils; said intermediate connection including a source of alternating current, and a rectifier in series with said source.

2. In a single-phase induction motor having a stator with a plurality of equiangularly spaced polar members, and a rotor: a plurality of coils, respectively surrounding said members; means for supplying a single-phase alternating current to only some of the coils; a pair of variable resistances; a connection intermediate the resistances to a point intermediate the other coils; and connections respectively between the other terminals of the resistances to other terminals of the said other coils; said intermediate connection including a source of alternating current, and a rectifier in series with said source, as well as a condenser across the rectifier.

3. In a single-phase induction motor having a stator with four equiangularly spaced polar members, and a rotor: a plurality of coils respectively surrounding said members; means for supplying a single-phase alternating current to a pair of adjacent coils; and means forming a pair of parallel closed circuits respectively with the other coils and having a common connection to the said other coils, said common connection including a rectifier.

4. In a single-phase induction motor having a stator with four equiangularly spaced polar members, and a rotor: a plurality of coils respectively surrounding the polar members; means for supplying a single-phase alternating current to a pair of adjacent coils; and means forming a pair of parallel closed circuits respectively with the other coils and having a common connection to the said other coils, said common connection including a rectifier, as well as a source of alternating current.

5. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed controlling circuit connected to the remaining coil or coils, and unconnected with the said group of coils.

6. In a single-phase induction motor having a stator with four equiangularly spaced salient polar members, each having a shading coil, and a rotor: coils respectively surrounding the polar members; means for supplying a single-phase alternating current to a pair of adjacent coils; and a speed-controlling circuit connected to the other two coils, and unconnected with said pair of adjacent coils.

7. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils, said circuit including an impedance.

8. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils; said circuit forming a closed circuit and including a variable resistance.

9. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed-controlling circuit connected to said other coils, and unconnected with said group of coils, said circuit including a pair of variable resistances, a connection intermediate said resistances to a point intermediate the other coils, and connections respectively between the other terminals of the resistances to other terminals of the said other coils.

10. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils, said circuit including a rectifier.

11. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils, said circuit including a rectifier, and a condenser connected across the rectifier.

12. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed-controlling circuit connected to said other coils, and unconnected with said group of coils, said circuit including a closed circuit for each of the other coils, and a common connection for the two closed circuits, said connection including a series rectifier.

13. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed-controlling circuit connected to said other coils, and unconnected with said group of coils, said circuit including a closed circuit for each of the other coils, and a common connection for the two closed circuits, said connection including a series rectifier, and a condenser connected across the rectifier.

14. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils, said circuit including a source of current.

15. In a single-phase induction motor having a stator with a plurality of equiangularly spaced salient polar members, each having a shading coil, and a rotor: a plurality of coils respectively surrounding the polar members; means for supplying a single-phase alternating current to a group of coils less than all of them, said group including coils surrounding polar members of different polarities; and a speed-controlling circuit connected to the remaining coil or coils, and unconnected with the said group of coils, said circuit including a source of current, as well as an impedance in series with said source of current.

16. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed-controlling circuit connected to said other coils, and unconnected with said group of coils, said circuit including a pair of impedances, a connection intermediate the impedances to a point intermediate the other coils, and connections respectively between the other terminals of said other coils.

17. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed controlling circuit connected to said other coils, and unconnected with said group of coils, said circuit including a pair of impedances, a connection intermediate the impedances to a point intermediate the other coils, connections respectively between the other terminals of said other coils, said intermediate connection including a rectifier.

18. In a single-phase induction motor having a stator with a plurality of equiangularly spaced polar members, and a rotor: a plurality of coils respectively surrounding the polar members; means for supplying a single-phase alternating current to a group of coils less than all of them, said group including coils surrounding polar members of different polarities; there being at least two other coils not included in said group; and a speed-controlling circuit connected to said other coils, and unconnected with said group of coils, said circuit including a pair of impedances, a connection intermediate the impedances to a point intermediate the other coils, connections respectively between the other terminals of said other coils, said intermediate connection including a source of alternating current and a rectifier.

DONALD E. WARNER.

References Cited in the file of this patent

UNITED STATES PATENTS

| Number | Name | Date |
|---|---|---|
| 520,764 | Bell | June 5, 1894 |
| 733,341 | Steinmetz | July 7, 1903 |
| 2,019,323 | Stark | Oct. 29, 1935 |
| 2,196,402 | Snyder | Apr. 9, 1940 |
| 2,322,942 | Lange | June 29, 1943 |
| 2,586,095 | Roters | Feb. 19, 1952 |